United States Patent [19]

Randa et al.

[11] Patent Number: 4,819,697

[45] Date of Patent: Apr. 11, 1989

[54] HELIUM CHARGED HYDRAULIC ACCUMULATORS

[75] Inventors: James Randa, Columbus; John L. Ucker, Gahanna, both of Ohio

[73] Assignee: Rockwell International Corporation, El Segundo, Calif.

[21] Appl. No.: 7,546

[22] Filed: Jul. 28, 1987

Related U.S. Application Data

[63] Continuation of Ser. No. 766,223, Aug. 16, 1985, abandoned.

[51] Int. Cl.[4] .......... F16L 55/04

[52] U.S. Cl. .......... 138/30; 138/31

[58] Field of Search .......... 138/26, 30, 31; 137/207; 220/85 B

[56] References Cited

U.S. PATENT DOCUMENTS

| | | | |
|---|---|---|---|
| 2,411,315 | 11/1946 | Ashton | 138/30 |
| 2,916,052 | 12/1959 | Peters | 138/30 |
| 3,856,048 | 12/1974 | Gratzmuller | 138/31 |
| 3,862,646 | 1/1975 | Tarsha | 138/30 |
| 4,145,959 | 3/1979 | Burden et al. | 92/8 |
| 4,185,652 | 1/1980 | Zintz et al. | 60/398 |
| 4,188,787 | 2/1980 | Bromell et al. | 60/416 X |
| 4,209,986 | 7/1980 | Cunningham | 60/403 |
| 4,294,288 | 10/1981 | Murthy | 138/30 |

FOREIGN PATENT DOCUMENTS

| | | | |
|---|---|---|---|
| 588332 | 5/1947 | United Kingdom | 138/30 |

*Primary Examiner*—James E. Bryant, III

*Attorney, Agent, or Firm*—Charles T. Silberberg; Lawrence N. Ginsberg; Chris Papageorge

[57] ABSTRACT

A helium charged accumulator is disclosed for use in hydraulic fluid pressure systems. The size of the accumulator is optimized for particular operating conditions of specific applications of the hydraulic systems by means of a formula. The formula has, as its terms, the volume of the hydraulic fluid required to power a given device, the compressibility factor of the particular gas used and the temperature and pressure of the gas at the beginning of, during, and at the end of the operation cycle of the accumulator.

4 Claims, 2 Drawing Sheets

HELIUM CHARGED HYDRAULIC ACCUMULATORS

This is a continuation of application Ser. No. 766,223, filed Aug. 16, 1985, now abandoned.

BACKGROUND OF THE INVENTION

1. Field of the Invention

This invention relates to gas precharged accumulators for use in hydraulic pressure fluid systems. Such hydraulic fluid systems may be used to power various given devices. For example, high pressure hydraulic fluid systems may be used to retract aircraft landing gear or to start auxiliary power units in aircraft.

2. Statement of the Prior Art

In the prior art there are typically three types of accumulators. One type uses a piston and cylinder design, another type uses a metal bellows design and the other type uses a bladder or flexible diaphragm. The piston design tends to be generally more light weight and has a relatively simple design. In contrast, although the metal bellows design is more complex, it has the advantage of being able to seal the gas within the chamber much better than the piston design. Although the diaphragm or bladder design provides an excellent seal, it does not have sufficient strength to accomodate the same high differential pressures as the other designs. Earlier models of these designs typically used air as the gas medium under pressure. The air preferably had water and corrosives removed in order to improve performance and increase useful life. In high pressure applications (i.e., approximately 3,000 psi or greater) both designs typically use pressurized nitrogen gas. Nitrogen has the advantage over air in that nitrogen does not tend to corrode the material forming the chamber of the accumulator and being inert does not react with the accumulator material. It is for this reason that nitrogen has found wide acceptance in high pressure accumulator applications.

Nitrogen and ordinary air used as a precharge gas ordinarily give satisfactory performance under moderate pressure and moderate temperature applications; however, under high pressure and very low temperature applications, both nitrogen and air lose a significant amount of energy. This reduces the gas volume and pressure available to exert force. These reductions necessarily reduce the power that can be applied to the hydraulic fluid to actuate the device. Consequently, at low temperature and high pressure applications, the accumulator size must be increased to contain more gas in order to provide the required energy to the system. However, even at at a higher temperature and lower pressure than these, nitrogen and air still lose a significant amount of the energy available to power a device. Consequently, the accumulators must be rather large in order to operate at such low temperatures and high pressures thus increasing their weight considerably. The weight and size of such accumulators clearly present significant disadvantages in aircraft applications.

SUMMARY OF THE INVENTION

Figure 2:
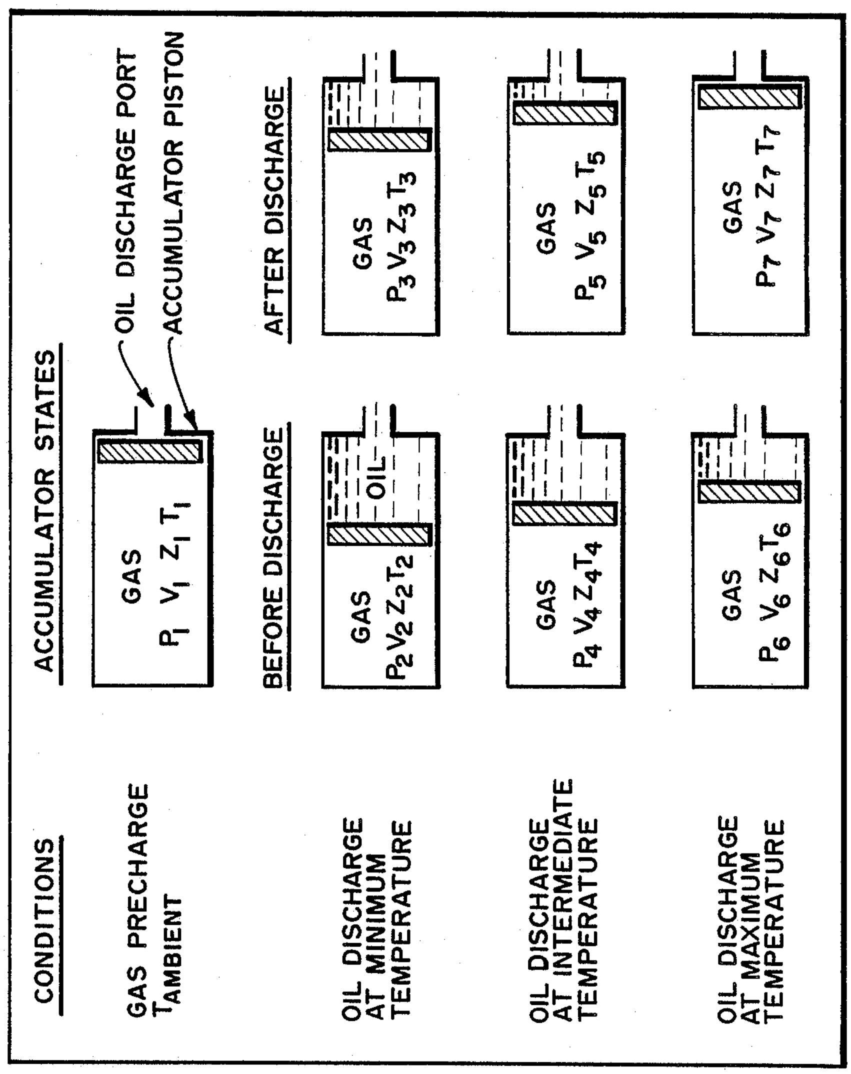
FIG. 2 illustrates the accumulator states for various minimum and maximum operating temperatures as used in the accumulator volume equation.

It is a principal object of the present invention to provide a precharged gas accumulator having a minimum volume of gas therein for given temperature and pressure ranges.

It is another object of the present invention to provide a method for determining the accumulator gas volume required for operation of the accumulator within a given temperature range and given pressure range.

It is yet another object of the invention to provide a gas accumulator of minimal size and weight for accumulator pressure applications in excess of 3,000 pounds per square inch.

Briefly, in accordance with the invention, there is provided an accumulator using helium as the precharging gas. Helium has not heretofore been used because it is very difficult to seal (due to its small molecular size); this is especially true with piston and diaphragm type accumulators. However, it has now been determined that metal bellows accumulators are able to seal the helium gas therein for a satisfactory period and number of operating cycles. It has further been determined in accord with the invention that helium behaves more like an ideal gas than the other gases used in prior art accumulators. Thus, at relatively low temperatures and high pressures, helium gas has more energy available to power the system. Although helium has a decided advantage over other gases at such low temperatures and high pressures at which the other gases may liquefy, it has also been shown that even at higher temperatures and lower pressures than these the other gases exhibit some liquid-like characteristics (although they have not turned into liquids); but helium does not have any such liquid-like characteristics at these temperatures and pressures and thus has more energy available to power the hydraulic fluid system. This translates into a lower required volume of gas in the hydraulic fluid system, and therefore a smaller accumulator may be used. Consequently, this reduces the size and weight of the accumulator and makes the entire hydraulic fluid system more practical and advantageous in many aircraft applications for which it would not otherwise ordinarily be feasible. For example, a helium accumulator system may be substituted for gas cartridge systems currently used to eject weapons from aircraft.

In line with the present invention, an accumulator with minimum volume (and resulting weight and size advantages) for a particular application can be used. This is in accord with a devised relationship between certain parameters. These include displacement of hydraulic fluid needed to actuate a given device, the compressibility factor of the accumulator gas used, the minimum and maximum operating temperatures of the accumulator gas and the minimum and maximum operating pressures of the accumulator gas. Using this relationship, the accumulator size and weight can be optimized for a given application resulting in significant size and weight savings for the accumulator.

Other objects and advantages of the present invention will be apparent upon reading the following detailed description and upon reference to the drawings.

DETAILED DESCRIPTION OF THE PREFERRED EMBODIMENT

Figure 1:
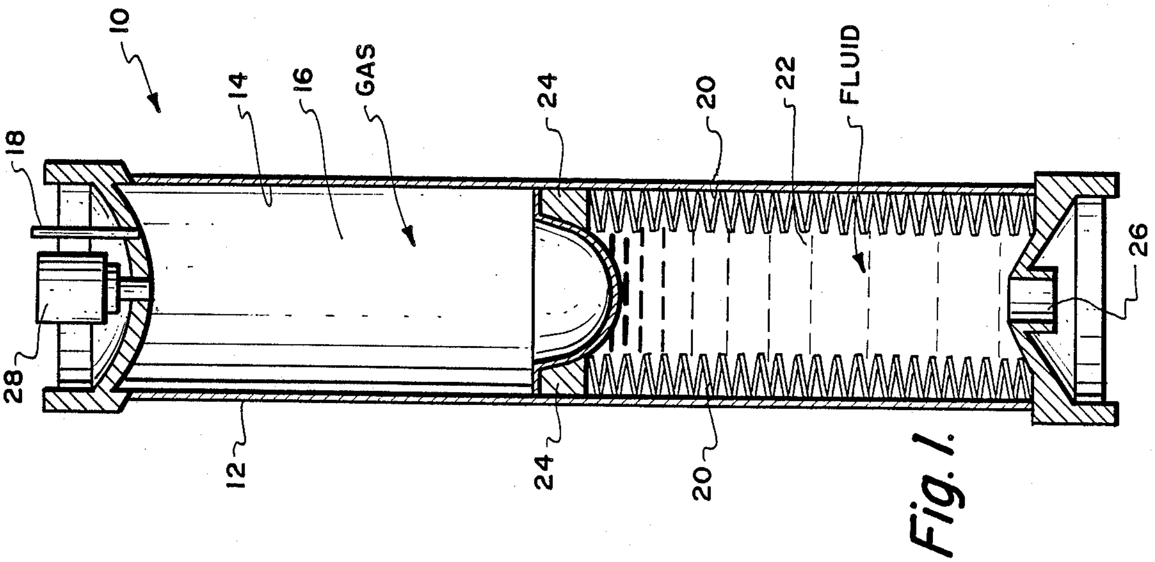
FIG. 1 shows a typical metal bellows accumulator charged with helium gas according to the disclosure of the present invention.

Referring now to FIG. 1, there is shown a metal bellows accumulator generally designated by the numeral 10. The accumulator 10 is adapted for use in hydraulic fluid systems used to power a given device. For example, in aircraft applications, such accumulators 10 may be used in hydraulic systems to retract landing gear or eject missiles and other weapons. The accumulator 10 has a housing 12. The housing 12 contains a chamber 14 which, in turn, contains precharged helium gas 16 under pressure. The helium gas 16 may be compressed to pressures in excess of 3,000 psi. The housing 12 also contains an inlet tube 18 to precharge the chamber 14 with the helium gas 16. The tube 18 is sealed after precharging the chamber 14. An inlet valve (not shown) may alternatively be provided in the inlet tube 18. The Inlet valve closes off the chamber after a desired quantity of helium gas 16 has been admitted into the chamber 14.

A metal bellows 20 is preferably positioned at one end of the chamber 14. The metal bellows 20 allows expansion of the helium gas 16 in the chamber 14 and also transmits the force exerted by the gas pressure to the hydraulic fluid 22. A guide 24 prevents cocking of bellows 20. The housing 12 is preferably provided with a hydraulic fluid port 26 which allows hydraulic fluid to be admitted into the housing and allows the fluid to make contact with the metal bellows 20. The port 26 is also preferably in one end of the metal bellows 20 as shown in FIG. 1. The metal bellows 20 can thereby displace a desired volume of hydraulic fluid out of the housing 12 and into the hydraulic fluid lines (not shown) of the system in order to activate a device. A pressure gauge 28 may also be provided.

FIG. 2 shows that accumulator 10 has different performance characteristics under different conditions of temperature. Specifically, at the lowest operating temperature shown, the accumulator 10 has the least amount of power available to displace the required quantity of hydraulic fluid. Thus, it is imperative that at the lowest operating temperature shown, the accumulator 10 has sufficient volume of gas under pressure therein to enable it to displace the required hydraulic fluid volume with sufficient force to power a given device. FIG. 2 also shows that because $p_7$ is greater than $p_3$ (i.e. the final pressure at the highest temperature is greater than the final pressure at the lowest temperature), at the highest temperatures shown the accumulator 10 has the greatest amount of energy available to power a given device. In order to minimize the size of the accumulator 10, the volume of the chamber must be optimized to enable a desired volume of fluid of a required energy content to be displaced at both minimum and maximum temperatures of operation.

Since there is a considerable difference in the accumulator sizes required for an isentropic versus an isothermal expansion process, it was critical to establish the actual nature of the gas expansion process. Referring again to FIG. 2, empirical data has shown that the gas expansion is approximately an isentropic process for rapid discharges of hydraulic fluid and that $P_2=P_4=P_6$. As a result of this research, a formula was derived which can yield the minimum accumulator size required for a given application. The formula is:

$$V_a = V_0\, 1 + \frac{\frac{P_2}{P_6}\,\frac{Z_6}{Z_2}\,\frac{T_6}{T_2}}{\frac{P_2}{P_3}\,\frac{Z_3}{Z_2}\,\frac{T_3}{T_2} - 1}$$

where $V_a$=accumulator volume=oil (hydraulic fluid) volume plus gas volume in the accumulator, $v_0$=hydraulic oil (fluid) required to power a given device, $T_2$=lowest accumulator gas temperature before oil discharge, $P_2$=accumulator gas pressure at $T_2$, $Z_2$=Compressibility factor, a function of $T_2$ and $P_2$, $T_3$=accumulator gas temperature after oil discharge, $P_3$=accumulator gas pressure at $T_3$, $Z_3$=compressibility factor, a function of $T_3$ and $P_3$, $T_6$=highest accumulator gas temperature before oil discharge, $P_6$=accumulator gas pressure at $T_6$, $Z_6$=compressibility factor, a function of $T_6$ and $P_6$.

Figure 3:
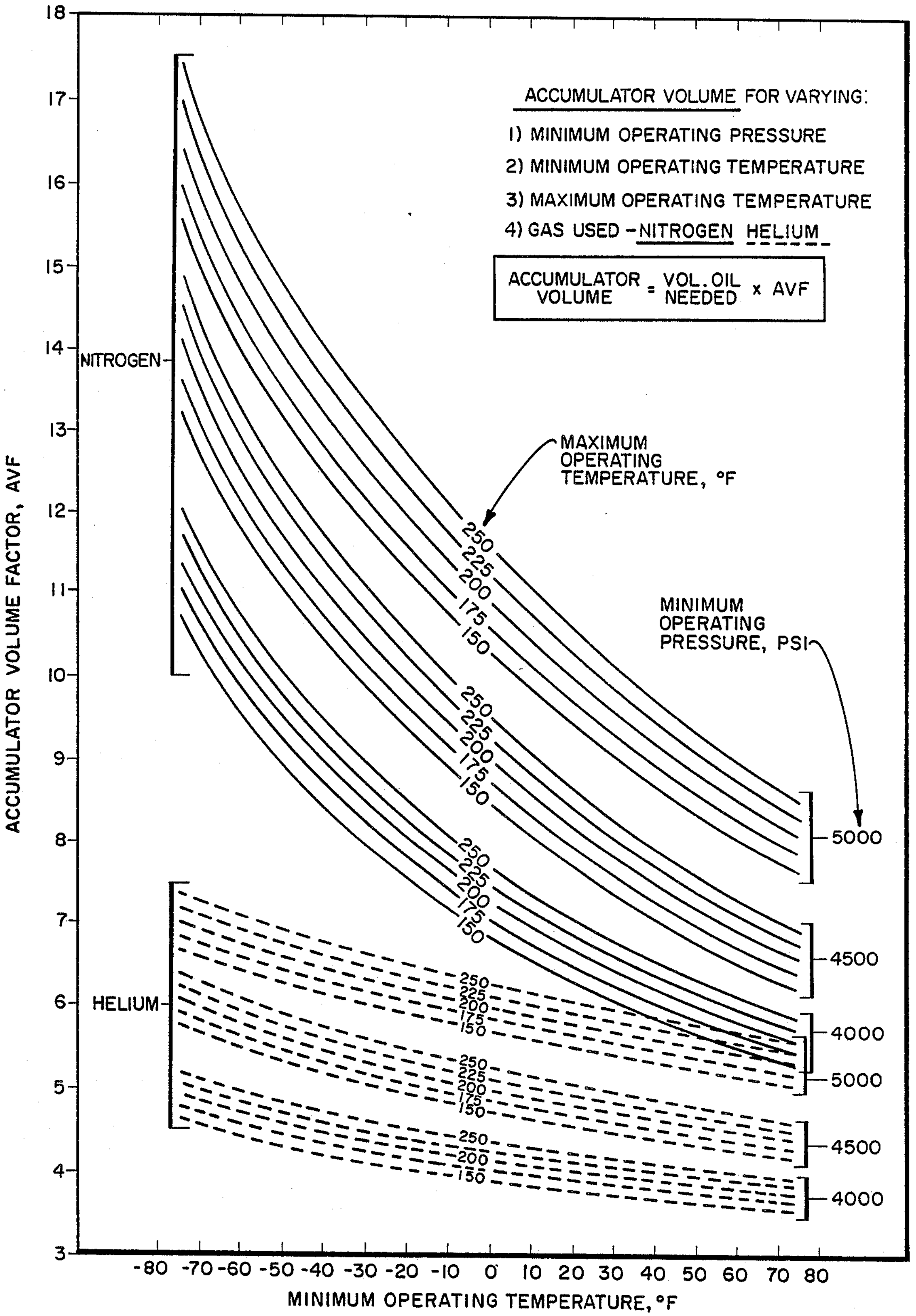
FIG. 3 is a comparison of accumulator volume for nitrogen as compared to helium at specified minimum and maximum operating temperatures for specified minimum operating pressure requirements.

Comparision of the accumulator size required when using nitrogen gas vs. helium gas as the charge medium shows a substantially smaller accumulator size when using helium gas therein. The savings in size when using helium gas are approximately 35 to 55 percent when the maximum operating pressure is 8000 psi and when the minimum operating pressure is approximately 4,000 to 5,000 psi. FIG. 3 compares the accumulator volume for given ranges of minimum operating pressures and minimum and maximum operating temperatures. It is apparent that substantial savings in both size and weight can result from the use of helium accumulators in high pressure and low temperature ranges as are common in modern high performance aircraft applications. It must be noted, however, that at system pressures less than 3,000 psi, there is not a substantial advantage in using helium in place of nitrogen for the purpose of reducing the accumulator size and weight.

Although helium has been used in detecting leaks in certain high pressure systems, it has not previously been used as the operating gas in such systems due to its very small molecular size and resulting tendency to leak past any conventional type of seal (and so its use as a leak detector). Indeed, the high energy capabilities and advantages of helium in high pressure and wide (and low) temperature range applications was not addressed by the prior art and therefore prior art systems did not investigate production of a system capable of using helium. Thus, the present invention extends the applicability of relatively small and lightweight gas precharged accumulators into high pressure systems having system pressures in excess of 3,000 psi.

Thus, it is apparent that there has been provided, in accordance with the invention, a helium charged accumulator system that fully satisfies the objectives, aims, and advantages set forth above. While the invention has been described in conjunction with specific embodiments set forth above, it is evident that many alternatives, modifications, and variations will be apparent in light of the foregoing description. Accordingly, it is intended to embrace all such alternatives, modifications, and variations that fall within the spirit and scope of the appended claims.

We claim:

1. An accumulator for use in high pressure hydraulic fluid systems, comprising:

a housing;

a chamber within said housing, said chamber sealingly containing a gas under pressure, said gas being helium, said gas under pressure in excess of approximately 3000 psi throughout an entire operative range of operating temperatures and pressures, the size of said chamber being substantially in accord with the equation:

$$V_a = V_0\left[1 + \frac{\left(\frac{P_2}{P_6}\right)\left(\frac{Z_6}{Z_2}\right)\left(\frac{T_6}{T_2}\right)}{\left(\frac{P_2}{P_3}\right)\left(\frac{Z_3}{Z_2}\right)\left(\frac{T_3}{T_2}\right) - 1}\right]$$

where $V_a$=accumulator volume=oil (hydraulic fluid) volume plus gas volume in the accumulator, $V_0$=hydraulic oil (fluid) required to power a given device, $T_2$=lowest accumulator gas temperature before oil discharge, $P_2$=accumulator gas pressure at $T_2$, $Z_2$=Compressibility factor, a function of $T_2$ and $P_2$, $T_3$=accumulator gas temperature after oil discharge, $P_3$=accumulator gas pressure at $T_3$, $Z_3$=compressibility factor, a function of $T_3$ and $P_3$, $T_6$=highest accumulator gas temperature before oil discharge, $P_6$=accumulator gas pressure at $T_6$, $Z_6$=compressibility factor, a function of $T_6$ and $P_6$;

metal bellows mounted in said chamber for allowing expansion of said gas in said chamber in order to transmit the force of said gas under pressure to the hydraulic fluid to displace a desired volume of hydraulic fluid in the system from said housing, throughout the range of operating temperatures and pressures.

2. The accumulator of claim 1 wherein said housing has a hydraulic pressure port for allowing the hydraulic fluid to contact said metal bellows so that a desired volume of hydraulic fluid may be displaced in the system.

3. The accumulator of claim 1 further including an inlet valve connected to said chamber for precharging said chamber with said gas under pressure.

4. The accumulator of claim 1 wherein the range of operating temperatures and pressures include a minimum temperature of approximately 80° F. and a maximum temperature of approximately 150° F.

* * * * *